(12) United States Patent
Cinto et al.

(10) Patent No.: US 10,214,148 B2
(45) Date of Patent: Feb. 26, 2019

(54) SYSTEM TO SECURE OBJECTS WITHIN A VEHICLE

(71) Applicant: GM GLOBAL TECHNOLOGY OPERATIONS LLC, Detroit, MI (US)

(72) Inventors: Adriana L. Cinto, Santo André (BR); Eduardo H. Lofrano, Santo André (BR); Eduardo Nakao, Santo André (BR); Renan Bichi, Sao Bernardo do Campo (BR); Wesley M. Amate, Santo André (BR)

( * ) Notice: Subject to any disclaimer, the term of this patent is extended or adjusted under 35 U.S.C. 154(b) by 0 days.

(21) Appl. No.: 15/637,212

(22) Filed: Jun. 29, 2017

(65) Prior Publication Data

US 2019/0001896 A1    Jan. 3, 2019

(51) Int. Cl.
*B60R 5/00* (2006.01)
*B60R 5/04* (2006.01)
*B60R 7/02* (2006.01)
*B60R 7/08* (2006.01)
*B60R 7/00* (2006.01)
*B60R 11/00* (2006.01)

(52) U.S. Cl.
CPC ............. *B60R 5/04* (2013.01); *B60R 7/02* (2013.01); *B60R 7/08* (2013.01); *B60R 7/005* (2013.01); *B60R 2011/008* (2013.01); *B60R 2011/0036* (2013.01); *B60R 2011/0052* (2013.01); *B60R 2011/0059* (2013.01); *B60R 2011/0071* (2013.01)

(58) Field of Classification Search
CPC .... B60R 5/04; B60R 7/02; B60R 7/08; B60R 7/005
USPC .................................... 224/275, 568
See application file for complete search history.

(56) References Cited

U.S. PATENT DOCUMENTS

| | | | | |
|---|---|---|---|---|
| 3,028,025 A | * | 4/1962 | White | B60P 1/64 224/401 |
| 3,139,045 A | * | 6/1964 | Rojakovick | A47B 43/003 108/109 |
| 3,685,708 A | * | 8/1972 | Herrington | B60R 11/02 224/483 |
| 4,171,078 A | * | 10/1979 | Morgan | B60R 11/06 211/187 |
| 2004/0262345 A1 | * | 12/2004 | Polburn | B60R 7/005 224/275 |
| 2008/0128460 A1 | * | 6/2008 | Adler | B60N 3/08 224/275 |

* cited by examiner

*Primary Examiner* — Peter N Helvey

(57) ABSTRACT

A system that can secure one or more objects in a vehicle interior is herein presented. The system includes: a rail, quick-release fastener, and belt. The rail is configured to mount in the vehicle interior and includes multiple adjustment points. The quick-release fastener is configured to move along a portion of the rail and configured to releasably fasten to each of the adjustment points. The quick-release fastener also has a connection point. The belt includes two straps releasably fastened to each other by a buckle. The belt also has two opposing strap ends and each strap end is configured to fasten to the connection point. The belt is moreover configured to secure one or more objects within the vehicle interior.

14 Claims, 4 Drawing Sheets

SYSTEM TO SECURE OBJECTS WITHIN A VEHICLE

INTRODUCTION

Cargo in vehicles, such as Sport Utility Vehicles and station wagons, tends to move around the vehicle interior as the vehicle travels from one location to another. Such movement can be distracting for the driver or cause damage to the vehicle interior and/or the cargo. It is therefore desirable to secure cargo in the vehicle interior so as to reduce the risk of driver distraction and damage to the vehicle interior and/or the cargo.

SUMMARY

A system that can secure one or more objects in a vehicle interior is herein presented. The system includes: a rail, quick-release fastener, and belt. The rail is configured to mount in the vehicle interior and includes multiple adjustment points. The quick-release fastener is configured to move along a portion of the rail and configured to releasably fasten to each of the adjustment points. The quick-release fastener also has a connection point. The belt includes two straps releasably fastened to each other by a buckle. The belt further has two opposing strap ends and each strap end is configured to fasten to the connection point. The belt is moreover configured to secure one or more objects within the vehicle interior.

In one or more embodiments, the system may further include a plurality of adjustment rails configured to mount within the vehicle interior in relation to a substantially horizontal axis. In these embodiments, the rail is further configured to movably mount to each of the adjustment rails such that the rail can move in relation to the substantially horizontal axis. The belt may be made from nylon. The buckle may be a side-release buckle or the buckle may be a double-ring buckle. The rail may be configured to mount to the backside of a vehicle seat which has been installed in the vehicle interior. The rail may also be configured to mount within the vehicle interior in relation to a substantially vertical axis.

Another version of the system that can secure one or more objects in a vehicle interior is herein presented. This version of the system includes a plurality of rails and a belt. The rails are configured to mount in the vehicle interior, each rail includes multiple adjustment points and two or more quick-release fasteners. Each quick-release fastener is configured to move along a portion of the corresponding rail and is configured to releasably fasten to each of the adjustment points. Each quick-release fastener also has a connection point. The belt includes two straps that are releasably fastened to each other by a buckle. The belt also has two opposing strap ends and each strap end is configured to fasten to the connection point of one of the quick-release fasteners which corresponds to the rail not associated with the opposite strap end. The belt is also configured to secure one or more objects within the vehicle interior.

In one or more embodiments, this system further includes two adjustment rails configured to mount in a parallel manner within the vehicle interior and in relation to a substantially horizontal axis. Moreover, each rail of the plurality of rails is further configured to movably mount to both adjustment rails such that each rail can move in relation to the substantially horizontal axis. The belt may be made from nylon. The buckle may be a side-release buckle or the buckle may be a double-ring buckle. Each rail may be configured to mount to the backside of a vehicle seat installed in the vehicle interior. Each rail may also be configured to mount within the vehicle interior in relation to a substantially vertical axis.

A method of installing an object securing system in a vehicle interior is also herein presented. The method includes the steps of: providing a vehicle interior; providing a plurality of belts, each belt including two straps releasably fastened to each other by a buckle, each belt having two opposing strap ends; mounting a plurality of rails in the vehicle interior, each rail including multiple adjustment points; movably connecting two quick-release fasteners along each rail, each quick-release fastener configured to releasably fasten to each of the adjustment points, each quick-release fastener having a connection point; and (per each belt) fastening each strap end to the connection point of one of the quick-release fasteners which corresponds to the rail not associated with the opposite strap end, wherein the plurality of belts can cooperate to secure one or more objects within the vehicle interior.

In one or more embodiments, the method may further include the step of: mounting two adjustment rails in a parallel manner within the vehicle interior and in relation to a substantially horizontal axis; and movably mounting each rail of the plurality of rails to both adjustment rails such that each rail can move in relation to the substantially horizontal axis. The buckle may be a side-release buckle or the buckle may be a double-ring buckle. Each rail may be mounted to the backside of a vehicle seat installed in the vehicle interior. Each rail may be mounted within the vehicle interior in relation to a substantially vertical axis.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
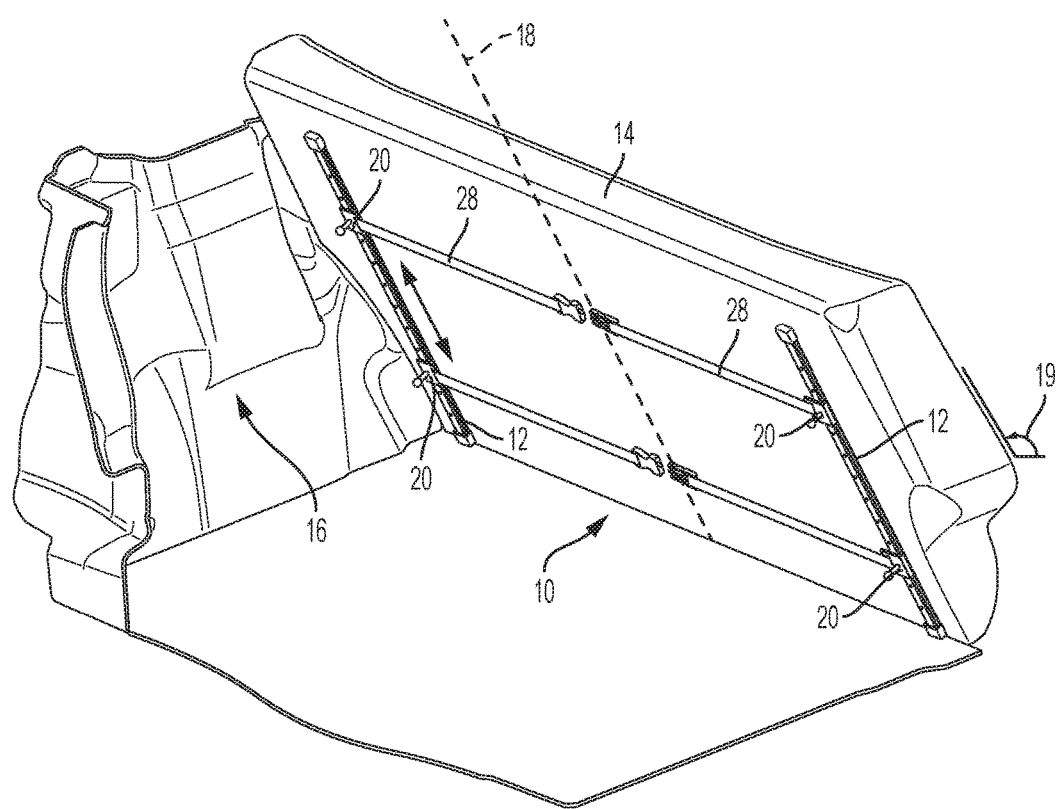
FIG. 1 is a perspective view of a system for securing one or more objects in a vehicle interior according to an aspect of the present disclosure.
Figure 2:
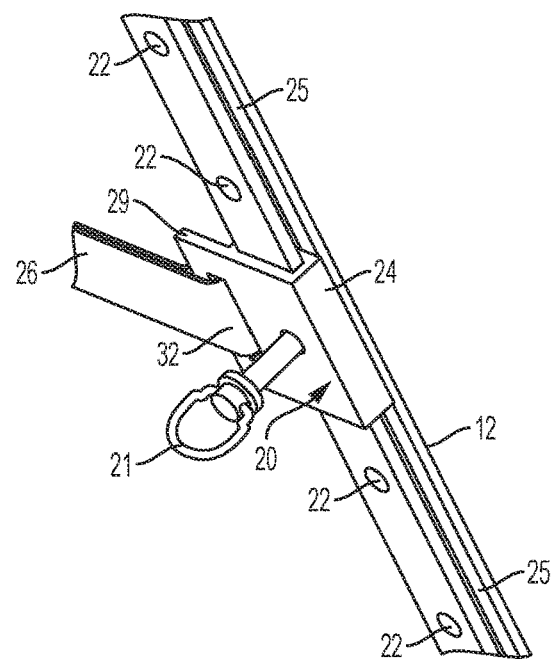
FIG. 2 is a perspective view of a quick-release fastener according to an aspect of the present disclosure.
Figure 3:
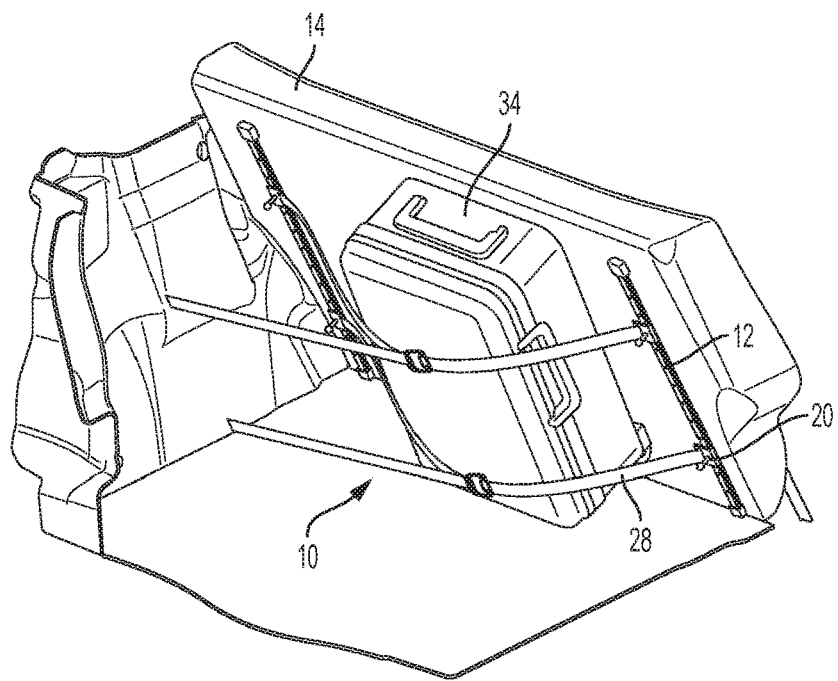
FIG. 3 is a perspective view of the system of FIG. 1 according to another aspect of the present disclosure.

Referring to the drawings in detail, and specifically to FIGS. 1 through 3, a system that can secure one or more objects in a vehicle interior is generally indicated by reference numeral 10. System 10 includes two parallel and identical rails 12, each typically constructed from sheet metal or plastic and being mounted to the backside of a vehicle seat's backrest 14 within the vehicle interior 16. As can be seen, each rail 12 is mounted in relation to an axis 18 that, for the most part, runs vertically along the backrest 14 (i.e., from the bottom to top of the back rest). Thus, the rails 12 are ultimately mounted within the vehicle interior 16 in a substantially vertical manner that is subject to the reclined angle 19 of the backrest (e.g., 105 degrees). Generally, the rails 12 are mounted to backrest 14 via fasteners (e.g., screws, bolts, nails, etc.); however, rails 12 may be temporarily mounted to backrest 14 through the implementation of hooks, hanging over the top of back rest, or straps, causing each rail to wrap around the body of backrest 14. When straps are used to mount the rails 12, each rail 12 may include end caps having slits (not shown) so as to allow these mounting straps to fasten to the rail 12.

Each of the rails 12 moreover has two identical quick-release fasteners 20 slidably mounted along their body. Each of these quick-release fasteners 20 are generally known to be self-locking and can be quickly released for adjustment purposes. For example, quick-release fastener 20 may include a locking mechanism 21 with an annular body feature (not shown) and corresponding cylindrical shank feature (not shown) inserted into the annular body. A spring may moreover be incorporated into the annular body and around the shank so as to enable reversible back-and-forth adjustment of the shank within the annular body. A compressible bulb or snap fit may be incorporated onto the shank and can protrude from one or more holes through the annular body while the shank is in a resting position and the bulb/snap fit is not being compressed. Moreover, during reversible adjustment, the bulb/snap fit may be forced to compress via shank movement and causing the bulb/snap fit to enter into the confines of annular body and so as to enable the annular body to enter orifices/cavities such as, for example, each of the adjustment points 22 established along the corresponding rail 12. However, when the shank is returned to its position of rest, the bulb/snap fit may again protrude from the annular body and thus cause the quick-release fastener 20 to remain interlocked with the respective adjustment point 22. It should be understood that various embodiments of quick-release fasteners are known in the art, including the embodiment described above.

Each side of quick-release fastener 20 moreover includes a backside extending flange configuration 24 that interlocks with a canal 25 on the rail side and consequently allow the entire quick-release fastener 20 to move along the rail 12 in a slidable yet non-detachable manner. As such, when the rails 12 are mounted in relation to axis 18, the slidably mounted quick-release fasteners 20 and associated components will likewise move in relation to axis 18. A belt 26, discussed in detail below, is fastened to a connection point 28 on the side of each quick-release fastener 20. As shown, the connection point 29 may simply be a peripherally extending flange having an elongated slit for a corresponding strap end of belt 26 to be stitched around.

Figure 6A:
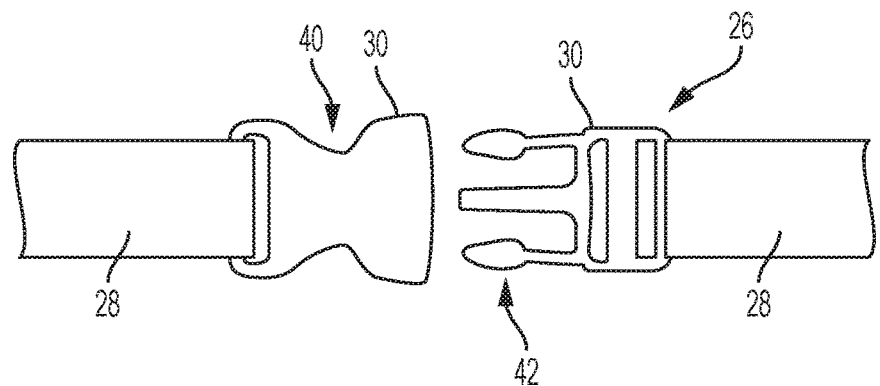
FIG. 6A is a side view of an embodiment of a belt buckle according to an aspect of the present disclosure.
Figure 6B:
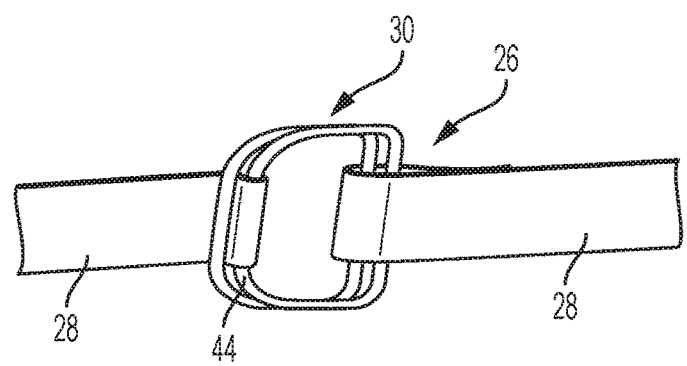
FIG. 6B is a side view of another embodiment of the belt buckle according to an aspect of the present disclosure.

The belt 26 itself is made of two independent nylon straps 28 releasably fastened together by a buckle 30 (FIGS. 6A and 6B). As such, at the end of each strap 28 is considered a strap end 32 that is oppositely positioned to the other strap end 32, when belt 26 is spread out from end-to-end. Accordingly, it is the strap ends 32 which fasten to the connection points 29 on the quick-release fasteners 20. As shown, each strap end 32 fastens to the connect point 29 of a quick-release fastener 32 on a rail 12 which has not yet been associated with the opposite strap end 32 of that same belt 26. This embodied configuration causes each belt 26 to be fastened between both rails 12 and thus not fastened to only one rail 12. That said, skilled artists will see that in embodiments of system 10 having only a single rail 12, belt 26 may be fastened to two independent quick-release fasteners 20 on that rail 12, or to a single quick-release fastener 20 configured to accommodate both ends of a single belt 28 (i.e., the fastener having two distinct configuration points). Furthermore, it should be understood that the belt straps 28 may be constructed from materials other than nylon such as, but not limited to, polyester, silicone, canvas, hemp, polyethylene, leather, any kind of cotton based cloth, or some combination thereof.

With specific reference to FIG. 3, belt 26 wraps around a substantial portion of an object 34 (e.g., luggage) and consequently causes the object 34 to become, at least temporarily, secured in vehicle interior 16. To mount such objects, a user simply needs to unlock/loosen buckle 30, wrap both belt straps 28 around the object, relock/tighten buckle 30, and ensure belt 26 affixes the object in place within the vehicle interior 16. Skilled artists will see that system 10 may only incorporate one belt 26 to secure an object 34 or system 10 may incorporate more than two belts 26 to accomplish this effect (i.e., system 10 may include more or less than four quick-release fasteners 20).

Figure 4:
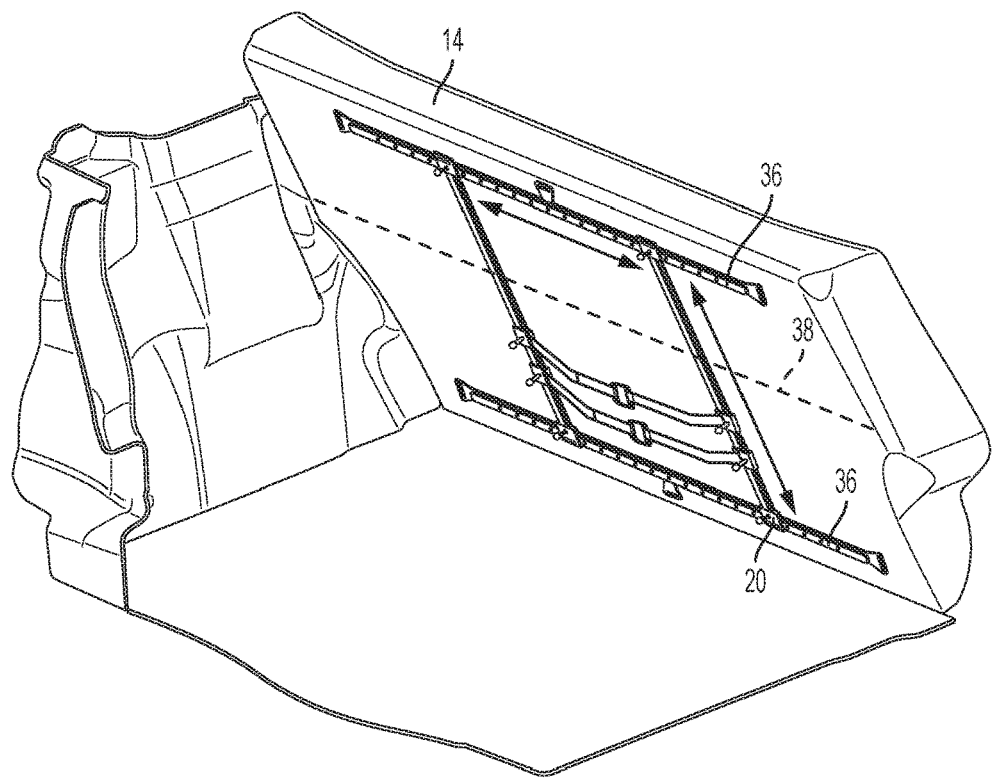
FIG. 4 is a perspective view of another embodiment of the system for securing one or more objects in a vehicle interior according to an aspect of the present disclosure.

As shown in FIG. 4, system 10 may further incorporate two adjustment rails 36, typically constructed from sheet metal or plastic and also mounted to backrest 14. The adjustment rails 36 may be mounted to backrest 14 in a parallel manner and in relation to an axis 38 which runs horizontally along the backrest 14 (i.e., from the left side to right side of the back rest 14, or vice versa). Thus, the adjustment rails 36 are ultimately mounted within the vehicle interior 16 in a substantially horizontal manner due to the orientation and positioning of the backrest 14. Similar to rails 12, the adjustment rails 36 are mounted to backrest 14 via fasteners (e.g., screws, bolts, nails, etc.). It should also be understood that, in those embodiments of system 10 having included these adjustment rails 36, the rails 12 are mounted directly onto the adjustment rails 36 and, hence, indirectly onto backrest 14.

Figure 5:
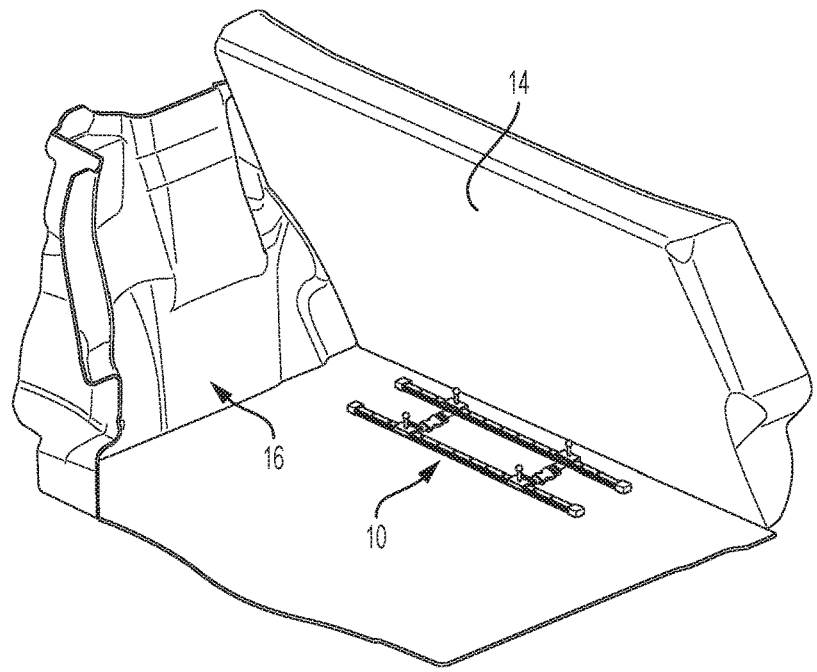
FIG. 5 is a perspective view of another embodiment of the system for securing one or more objects in a vehicle interior according to an aspect of the present disclosure.

Each adjustment rail 36 additionally includes numerous adjustment points 22. As such, when system 10 incorporates adjustment rails 36, each end of the rails 12 may include a quick-release fastener 20 (similar to the embodiment discussed above) slidably mounted onto the adjustment rail to allow for the quick-release fasteners 20, and thus rails 12, to move in relation to horizontal axis 38. FIG. 5 shows that system 10 may be installed at different locations within the vehicle interior 16 and is not solely adapted to be moved onto backrest 14. For example, system 10 may be installed onto the floor of vehicle interior 16 or it may be installed onto one or more walls of the interior 16.

As shown in FIGS. 6A and 6B, embodiments of buckle 30 may include, but are not limited to, a side-release buckle (FIG. 6A) and double-ring buckle (FIG. 6B). When having a side-release embodiment, the buckle 30 includes a female member 40 and male member 42, which securably inserts into female member 40. Furthermore, male member 42 includes a guide beam which can move into a reciprocal channel (not shown) formed in the female member 40, to ensure proper mating alignment between the male and female members 42 and 40, respectively. As the male member 42 is urged into the female member 40, the member's lateral arms deflect inwardly until reaching openings formed through the female member 40. When a substantial portion of these lateral arms reach these openings, the tension stored in the lateral arms snapably forces the lateral arms laterally outward, through the openings, and the male member 42 is secured to the female member 40. Alternatively, when having a double-ring embodiment, buckle 30 includes two metallic rings 44. Excess belt material is then securably inserted between the rings 44 such that, when stress is applied, the rings 44 clamp together and apply pinching pressure to the belt material so as to stop any material movement through slippage.

Returning to FIG. 1, a method to install the object securing system 10 is discussed below. To install the system 10, in a first step, the rails 12 are required to be mounted within the vehicle interior 16, for example, against the seat backrest 14. As discussed above, the rails 12 may be fastened to the vehicle interior 16 through the use of fasteners such as, but not limited to, screws or bolts. In a second step, at least two quick-release fasteners 20 are slidably connected to each rail 12. For example, one may slide each quick-release fastener 20 at one end of the rail 12 such that its backside flange configurations 24 interlock with canal 25 to allow the quick-release fastener 20 to move laterally along the rail 12. This slidable connection also allows the quick-release fasteners 20 to releasably fasten to the adjustment points. A third step is repeated until all belts are fastened and properly secured in system 10. In this third step, each strap end 32 is fastened to the connection point 28 of the quick-release fastener 24 that is on a rail 12 that doesn't already have the belt's opposite strap end 32 already connected to the rail 12 at any location (e.g., the other slidably mounted quick-release fastener 24). This step should thus allow all belts 26 to properly secure into system 10. The belts 26 should also be provided space for the freedom of movement so as to be able to cooperate to secure objects within the vehicle interior 16 (as shown in FIG. 3). As such, once the belts 26 can secure objects the method of installation should be complete.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system that can secure one or more objects in a vehicle interior, the system comprising:
   a rail configured to mount in the vehicle interior, the rail comprising multiple adjustment points and a canal located along a side of the rail;
   a quick-release fastener comprising a body with a backside extending flange, the backside extending flange configured to interlock with the canal to allow the quick-release fastener to slidably move along a portion of the rail in a defined and non-detachable manner, a locking mechanism is operatively connected to the body of the quick-release fastener, the locking mechanism configured to releasably enter into each of the adjustment points so as to releasably fasten the quick-release fastener to the rail, the quick-release fastener having a connection point, wherein the connection point is a flange that peripherally extends along the body of the quick release fastener and comprising an elongated slit; and
   a belt comprising two straps releasably fastened to each other by a buckle, the belt having two opposing strap ends and each strap end configured to fasten to the connection point via the strap end being stitched around the elongated slit, the belt configured to secure one or more objects within the vehicle interior.

2. The system of claim 1, further comprising:
   a plurality of adjustment rails configured to mount within the vehicle interior in relation to a substantially horizontal axis; and
   wherein at least one end of the rail comprising a quick-release fastener configured to slidably mount to each of the adjustment rails such that the rail can move along a portion of the rail in a defined and non-detachable manner and in relation to the substantially horizontal axis.

3. The system of claim 1, wherein the belt is made from nylon.

4. The system of claim 1, wherein the buckle is a side-release buckle.

5. The system of claim 1, wherein the buckle is a double-ring buckle.

6. The system of claim 1, wherein the rail is configured to mount to the backside of a vehicle seat installed in the vehicle interior.

7. The system of claim 1, wherein the rail is configured to mount within the vehicle interior in relation to a substantially vertical axis.

8. A system that can secure one or more objects in a vehicle interior, the system comprising:
   a plurality of rails configured to mount in the vehicle interior, each rail comprising multiple adjustment points, a canal located along a side of the rail, and two or more quick-release fasteners;

each quick-release fastener comprising a body with backside extending flange, the backside extending flange configured to interlock with the canal to allow the quick-release fastener to slidably move along a portion of the corresponding rail in a defined and non-detachable manner, a locking mechanism operatively connected to the body of each quick-release fastener, each locking mechanism configured to releasably enter into each of the adjustment points so as to releasably fasten the quick-release fastener to the rail, each quick-release fastener having a connection point, wherein the connection point is a flange that peripherally extends along the body of the quick release fastener and comprising an elongated slit;

a belt comprising two straps releasably fastened to each other by a buckle, the belt having two opposing strap ends and each strap end configured to fasten to the connection point of one of the quick-release fasteners which corresponds to the rail not associated with the opposite strap end via the strap end being stitched around the elongated slit of the connection point, the belt configured to secure one or more objects within the vehicle interior.

9. The system of claim 8, further comprising:
two adjustment rails configured to mount in a parallel manner within the vehicle interior and in relation to a substantially horizontal axis; and
wherein each end of each rail of the plurality of rails comprises a quick-release fastener configured to slidably mount to the corresponding adjustment rail such that each rail can move along a portion of the rail in a defined and non-detachable manner and in relation to the substantially horizontal axis.

10. The system of claim 8, wherein the belt is made from nylon.

11. The system of claim 8, wherein the buckle is a side-release buckle.

12. The system of claim 8, wherein the buckle is a double-ring buckle.

13. The system of claim 8, wherein each rail of the plurality of rails is configured to mount to the backside of a vehicle seat installed in the vehicle interior.

14. The system of claim 8, wherein each rail is configured to mount in the vehicle interior in relation to a substantially vertical axis.

* * * * *